United States Patent [19]

Ward et al.

[11] 3,887,460

[45] June 3, 1975

[54] SELECTIVE ION EXCHANGE RESINS

[75] Inventors: Christopher John Ward; Cyril Alfred Morgan, both of Chadwell Heath; Richard Paul Allen, Surbiton, all of England

[73] Assignee: United States Borax & Chemical Corporation, Los Angeles, Calif.

[22] Filed: June 1, 1973

[21] Appl. No.: 365,909

[52] U.S. Cl. .............................. 210/37; 260/2.1 C
[51] Int. Cl. ............................................ C02b 1/56
[58] Field of Search ....... 210/24, 37, 38; 260/2.1 C, 260/2.2 C

[56] References Cited
UNITED STATES PATENTS

| | | | |
|---|---|---|---|
| 2,104,501 | 1/1938 | Adams et al. | 210/38 |
| 2,389,865 | 11/1945 | Mills et al. | 260/2.1 C |
| 2,813,838 | 11/1957 | Lyman et al. | 210/24 |
| 3,539,506 | 11/1970 | Kane et al. | 210/37 |
| 3,803,059 | 4/1974 | Kessick | 260/2.1 C |

OTHER PUBLICATIONS

Polymer Letters, "Phenolic Resins Capable of Boron Complexation," Vol. 10, p. 527–530.
Chemical Abstracts, Vol. 74, p. 242, 1971.
Chemical Abstracts, Vol. 74, p. 482, 1971.

*Primary Examiner*—Samih N. Zaharna
*Assistant Examiner*—Peter A. Hruskoci
*Attorney, Agent, or Firm*—James R. Thornton

[57] ABSTRACT

Ion exchange resins utilized for removing boron or arsenic from aqueous solutions. The resins are especially effective when the solutions contain other dissolved salts, such as sulfates and chlorides, particularly calcium chloride.

7 Claims, No Drawings

SELECTIVE ION EXCHANGE RESINS

This invention relates to ion-exchange resins and to an improved method for the removal of ionic species from aqueous solutions.

Ion exchange or ion chelation may be defined as the reversible interchange of ionic species between a liquid phase and a solid phase (the resin) such that the solid phase undergoes no permanent change.

An object of the present invention is the provision of an ion-exchange resin which is selective for anions or acids containing boron or arsenic. Most currently available conventional anion-exchange resins have low selectivity for boron-containing ions which makes their use impractical in any but pure solutions.

It is well known that boric acid and borate ions form strong complexes with dihydroxy compounds having an appropriate steric configuration. It is also known that such hydroxy compounds may be successfuly incorporated into selective ion-exchange media by polymerization with formaldehyde. However, relative positions of the components of such resins are not necessarily sterically favorable for interaction with boron species.

It has been found that complexes formed from aromatic hydroxy compounds and anions containing boron, may be used in the formation of a highly selective ion exchange resin by polymerization with, for example, formaldehyde. Accordingly, this invention provides a resin formed by the polymerization process between a suitably pre-formed complex of boron and an aryl-hydroxy compound and formaldehyde, or a formaldehyde generating source together with a suitable cross linking agent. Examples of suitable aryl-hydroxy compounds are phenol, dihydroxybenzenes, trihydroxybenzenes, (and other aryl compounds with methanol groups adjacent to the phenolic group), dihydroxynaphthalenes, and their substituted derivatives, for example, salicylic acid and gallic acid. A suitable cross linking agent is resorcinol. Basic catalysts such as sodium and ammonium hydroxides and zinc oxide are preferably employed.

A particular advantage of this invention is the provision of an ion-receiving site, based on the stereochemistry of the original boron-containing complex, which is preserved when manufactured during polymerization and subsequent removal of initial borate, and when used, during loading and elution of boron species from the resin. Thus, ion-exchange resins made according to this invention will have anion-receiving sites of the same stereo-chemistry as the tetrahedral borate ion. The resins therefore possess improved properties for the specific removal of borate, boric acid and arsenite.

Another feature of the resins, according to the invention, is that they can be used as an initial block for the production of higher molecular weight polymers. The invention is illustrated by the following examples.

EXAMPLE I

Oriented Salicylic Acid Resins

A boric acid-salicylic acid complex was formed by heating the following mixture until a clear solution was obtained.

| | |
|---|---|
| Salicylic acid | 13.8 g. ; 0.1 mol. |
| Boric acid | 3.1 g. ; 0.05 mol. |
| Sodium hydroxide | 2.0 g. ; 0.05 mol. |
| Water | 25 ml. |

The clear solution was mixed with 40 percent w/v formaldehyde solution (36 ml.) and anhydrous sodium acetate (20 g.) was dissolved in this mixture. After heating the solution for 30 minutes at 60°C., resorcinol (5.5 g.; 0.05 mol.) was added and dissolved. The resulting mixture was heated and stirred for a further 60 minutes at 60°C. when, after becoming increasingly viscous, it set to a resilient, orange-colored gel. The gel was cured for 12 hours at 110°C.

Cured resin (33 g.) was ground and screened to −30 + 100 U.S. mesh. Boric acid was leached from the resin with hot 10 percent hydrochloric acid. 1.0 g. of the washed resin was converted to the $Na^+$ form and placed in 150 ml. of a solution containing 25 mg. B (as borax) at a pH of 9.5. After three days, 1.0 g. of resin was found to have removed 4.2 mg. B from the test solution.

EXAMPLE II

Oriented Gallic Acid Resin

The gallic acid-boric acid complex was formed by heating the following mixture until a clear solution was obtained.

| | |
|---|---|
| Gallic acid | 9.4 g. ; 0.05 mol. |
| Boric acid | 3.1 g. ; 0.05 mol. |
| Sodium hydroxide | 4.0 g. ; 0.1 mol. |
| Anhydrous sodium acetate | 5.0 g. |
| Water | 30 ml. |

The solution was mixed with 40 percent w/v formaldehyde solution (8 ml.; 0.11 mol.) and the resulting mixture heated for 40 minutes at 45°C. Resorcinol (2.57 g.; 0.025 mol.) was then added. The resulting mixture was heated and stirred for a further 90 minutes, after which it gradually set to a tough wine-red gel. The gel was cured for 16 hours at 90°C.

The cured resin was ground and screened to −30 + 100 U.S. mesh. Boric acid was leached from the resin with hot 10 percent hydrochloric acid. 1.0 g. of the washed resin was converted to the $Na^+$ form and placed in 150 ml. of a solution containing 25 mg. B (as borax) at a pH of 8.8. After three days, 1.0 g. of resin was found to have removed 6.4 mg. B from the test solution.

EXAMPLE III

Resin prepared according to Example II was converted to its $Na^+$ form.

A solution containing

| | |
|---|---|
| B (as borax) | 10 p.p.m. |
| $SO_4^=$ | 1800 p.p.m. |
| $Cl^-$ | 600 p.p.m. | was prepared and buffered to pH = 9.5, and passed through the resin at a rate of 2 g/min/cu.ft. Collection and analysis of the effluent showed the resin capacity to be 0.35 mg. B/ml.

EXAMPLE IV

Resin (1.0 g.) prepared according to Example II was converted to its H$^+$ form and placed in 200 ml. of a solution containing 50 mg. arsenite (As[III]) at a pH of 9.5. After three days, 1.0 g. of the resin was found to have removed 8.2 mg. As from the test solution.

EXAMPLE V

A control resin (free of B) prepared as in Example II was tested according to Example III. Collection and analysis of the effluent showed the resin capacity to be 0.2 mg. B/ml.

The resins are especially useful for absorbing boron-containing and arsenic-containing ions from aqueous solutions containing dissolved salts such as sulfates and chlorides, especially salts of metals in Group IIA of the Periodic Table, such as calcium. For optimum absorption capacity, the pH of the aqueous solution should be not less than 4.

EXAMPLE VI

Phenol (94 g.) was dissolved in 40 percent formaldehyde solution (225 ml.) and the mixture cooled before adding sodium hydroxide (40 g.). The resulting solution was refluxed for five hours at 80° to 90°C., after which it gelled to form a red resin. This material was cured at 80°C. for 36 hours. Cured dried resin (150 g.) was ground and screened to a particle size of $-30 + 100$ U.S. mesh, and conditioned with alternate washings with solutions of 5 percent HCl and 5 percent NaOH.

The following Examples illustrate use of the resin in absorbing boron from solutions containing alkaline metal salts.

EXAMPLE VII

An aqueous solution containing

| | |
|---|---|
| B | 10 p.p.m. as Na$_2$B$_4$O$_7$ |
| Ca | 100 p.p.m. as CaCl$_2$ |
| Na | 2000 p.p.m. as Na$_2$SO$_4$ | was passed through a column containing the resin, prepared as described in Example VI. After passage of 140 "bed-volumes" of solution through the resin, 1.0 p.p.m. B was found in the effluent.

EXAMPLES VIII-XII

| Ex. No. | Test Solution | No. of "bed volumes" before 1.0 p.p.m. B found in effluent |
|---|---|---|
| 8 | 10 p.p.m. B as Na$_2$B$_4$O$_7$<br>100 p.p.m. Ca as CaCl$_2$<br>2000 p.p.m. Na as NaCl | 140 |
| 9 | 10 p.p.m. B as Na$_2$B$_4$O$_7$<br>2000 p.p.m. Na as Na$_2$SO$_4$ | 75 |
| 10 | 10 p.p.m. B as Na$_2$B$_4$O$_7$<br>2000 p.p.m. Na as NaCl | 34 |
| 11 | 10 p.p.m. B as Na$_2$B$_4$O$_7$<br>100 p.p.m. Ca as CaCl$_2$ | 42 |
| 12 | 10 p.p.m. B as Na$_2$B$_4$O$_7$ | 14 |

As demonstrated above, the resins are particularly effective for absorbing boron from solutions containing salts such as sodium sulfate and chloride, and especially calcium chloride.

Various changes and modifications of the invention can be made, and, to the extent that such variations incorporate the spirit of this invention, they are intended to be included within the scope of the appended claims.

What is claimed is:

1. The method of removing boron and arsenic anions from an aqueous solution having at least one of said anions dissolved therein which comprises contacting said aqueous solution with a cross-linked hydroxyaryl polymer having tetrahedral boron anion-receiving sites formed by polymerization of a pre-formed complex of a hydroxyaryl compound and boron anion with a formaldehyde source and leaching the formed polymer with an acid which is effective in removing said boron anion and providing said boron anion-receiving sites.

2. The method according to claim 1 in which said aqueous solution contains inorganic salts in addition to said boron and arsenic compounds dissolved therein.

3. The method according to claim 2 in which said inorganic salt is selected from the sulfates and chlorides of sodium and calcium.

4. The method according to claim 2 in which said inorganic salt is calcium chloride.

5. The method according to claim 1 in which said polymer is formed by reaction of salicylic acid, boric acid and formaldehyde in the presence of sodium hydroxide and then cross-linked with resorcinol.

6. The method according to claim 1 in which said polymer is formed by reaction of gallic acid, boric acid and formaldehyde in the presence of sodium hydroxide and then cross-linked with resorcinol.

7. The method according to claim 1 in which said aqueous solution has a pH of at least 4.

* * * * *

UNITED STATES PATENT OFFICE
CERTIFICATE OF CORRECTION

PATENT NO. : 3,887,460
DATED : June 3, 1975
INVENTOR(S) : CHRISTOPHER JOHN WARD et al.

It is certified that error appears in the above-identified patent and that said Letters Patent are hereby corrected as shown below:

On Title Page, Column 1 after Related U.S. Application Data insert the following --Foreign Application Priority Data June 8, 1972          United Kingdom     26730/72

October 26, 1972      United Kingdom     49474/72 --

Signed and Sealed this

*twenty-third* Day of *March 1976*

[SEAL]

*Attest:*

RUTH C. MASON
*Attesting Officer*

C. MARSHALL DANN
*Commissioner of Patents and Trademarks*